Sept. 8, 1931.  G. J. ZISCH  1,822,001
THERMOSTATIC CONTROL DEVICE
Filed Dec. 20, 1928   2 Sheets-Sheet 1
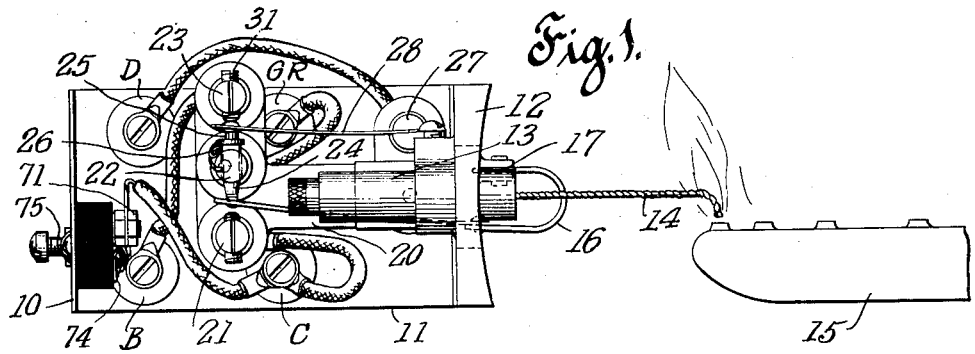
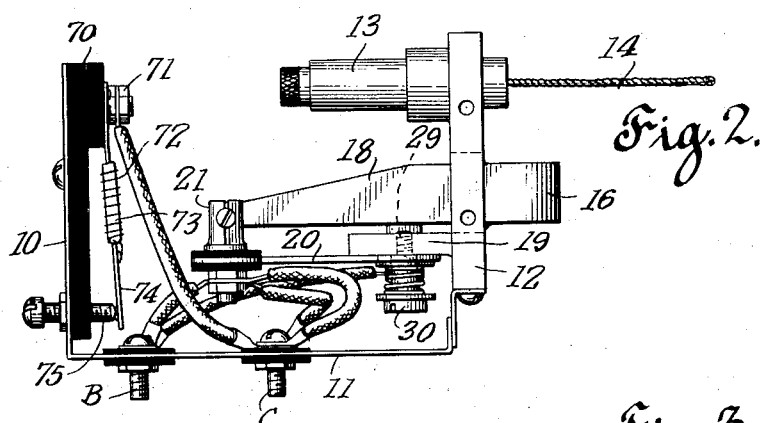
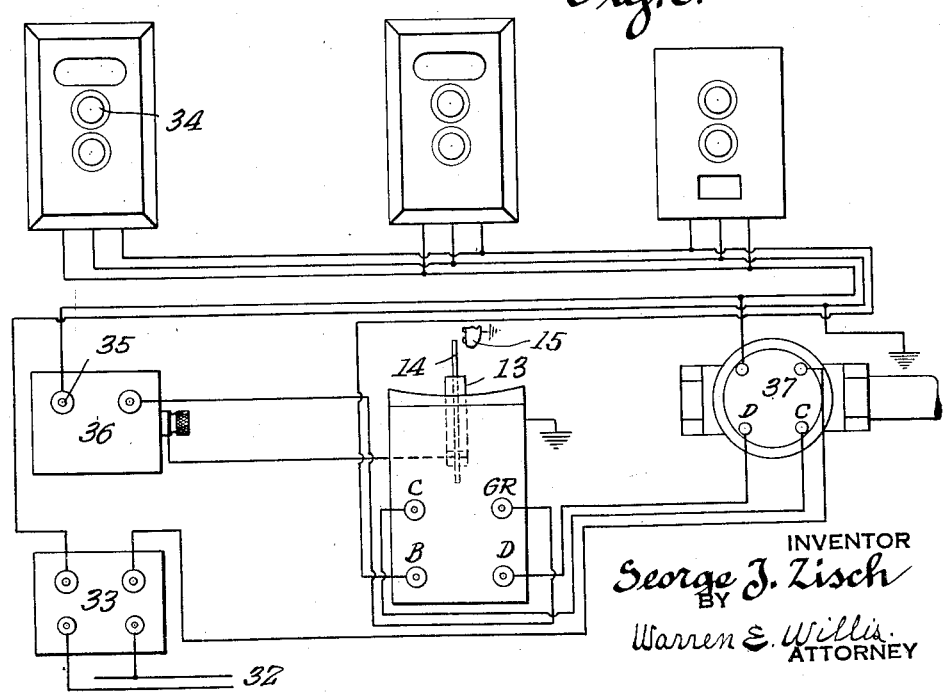
INVENTOR
George J. Zisch
BY
Warren E. Willis.
ATTORNEY

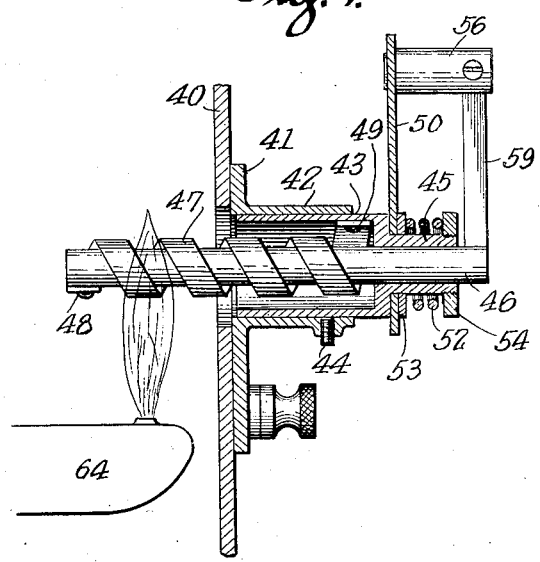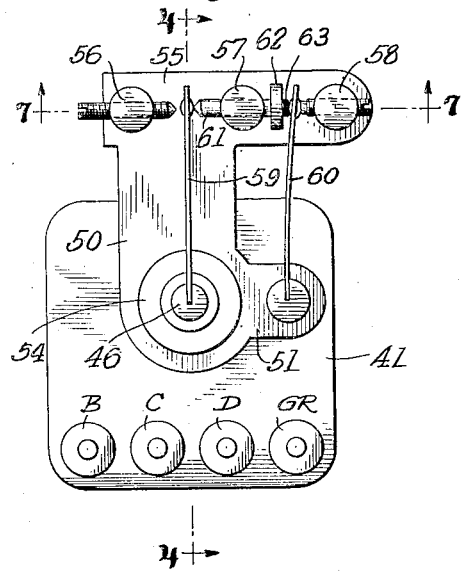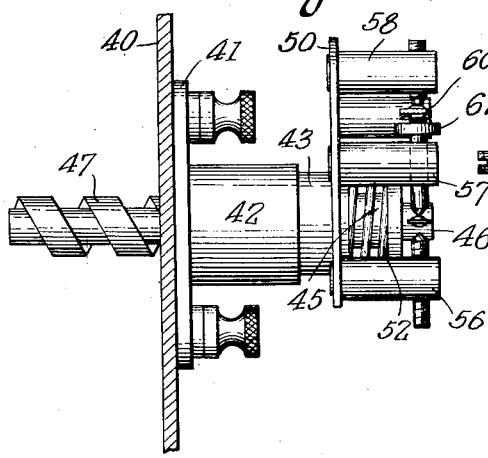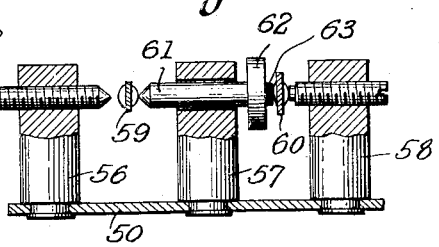

Patented Sept. 8, 1931

1,822,001

UNITED STATES PATENT OFFICE

GEORGE J. ZISCH, OF NEWARK, NEW JERSEY

THERMOSTATIC CONTROL DEVICE

Application filed December 20, 1928. Serial No. 327,201.

This invention relates to thermostatically controlled ignition devices adapted for use in connection with gas and oil burning apparatus.

The ignition of oil by electrical means, such as a spark plug, has been found unsatisfactory in that the spark is unreliable and is not always hot enough to ignite the oil. Also, the spark plug must be placed directly over the oil to be ignited, with the result that it soon becomes covered with carbon, and the point of sparking is gradually shifted away from its most effective position. Such a condition often leads to a dangerous situation in which oil is allowed to flow without being ignited, and when proper ignition has been provided the accumulated oil is likely to cause an explosion.

With a thermostatic control such as described herein, there is provided a gas supply, which is ignited by a spark plug when so desired, and the gas flame ignites the oil. The gas flame has no carbonizing effect on the spark plug, and the unsatisfactory and dangerous results outlined above are eliminated.

A further application of the invention is in the control of gas burning hot water heaters. With the usual heater of that type, a pilot light is employed which burns constantly and is an unnecessary source of expense. Should the pilot light be blown out or become extinguished by other means, the gas will continue to flow with the result that the room is soon filled with a dangerous explosive gas and the introduction of a flame is likely to lead to a disaster.

With the control device herein disclosed, a pilot light is not employed and the heating gas is ignited directly by a spark plug. After the gas has burned for a few seconds there has been produced sufficient heat to cause a thermostatic switch to discontinue the action of the spark plug. Should, for any reason, the flame be extinguished, the thermostatic element in the switch will cool and move to a position to control a switch for automatically closing a valve to discontinue the flow of gas.

Consequently, it is an object of this invention to provide a thermostatic switching device, which when cold, will close a circuit to enable the operation of a spark plug, and when hot will break the spark plug circuit.

A further object of the invention is the provision of a thermostatic device for controlling the operation of a spark and the action of a valve in a gas supply pipe.

These and other objects are attained by the novel construction, combination and arrangement of parts hereinafter described and shown in the accompanying drawings, constituting a material part of this disclosure, and in which:—

Figure 1 is a plan view of the preferred form of the device.

Figure 2 is a side view of the preferred form.

Figure 3 is a schematic wiring diagram illustrating an application of the device.

Figure 4 is a side view of a modification of the device, taken on line 4—4 of Figure 5.

Figure 5 is an end view of the modified form.

Figure 6 is a plan view of the form shown in Figure 4.

Figure 7 is a sectional view taken on line 7—7 of Figure 5.

Referring to Figures 1 and 2, a sheet metal casing is shown to have walls 10 and 11 at right angles to each other. Fixed to wall 11 and parallel to wall 10 is metal plate 12, preferably made of brass, on which is mounted a spark plug 13 having an electrode 14 adapted to be positioned over a gas burner 15, as shown in Figure 1.

A strip 16 of thermostatic metal bent upon itself, has one end fixed to the plate 12 at 17, the other end of the strip 16 being attached to a brass strip 18 which extends through an aperture in the plate 12. Projecting from plate 12 is a lug 19 to which is fixed one leg of a U-shaped support 20. The upper leg of the support 20 has mounted thereon and insulated therefrom three terminals 21, 22, 23. The terminal 22 has a transverse aperture in which is slidably positioned a contact pin 24 having its extremities projecting beyond the sides of the terminal, so that one extremity will normally contact with brass strip 18, which lies between terminals 21 and 22, while the other extremity is provided with a tip 25 of insulating material and lies between terminals 22 and 23. A flange 26, integral with the pin, limits the movement of the latter in one direction.

The lower leg of the U-shaped member 20 projects beyond the lug 19 and has mounted thereon a terminal 27 in which is clamped a resilient brass strip 28, which normally bears against the insulator tip 25.

The support 20 is rotatably connected to lug 19 by a pin 29, encircled by a torsion spring 30, which normally tends to rotate the support in a clockwise direction (Fig. 1).

The terminals 21, 22, 23 are respectively connected to terminals C, GR, and B, mounted on the wall 11, while the terminal 27 is connected to the terminal D.

To insure positive electrical connection between terminal 22 and pin 24 a small wire is soldered to terminal 22 and flange 26.

When the thermostatic metal is cold, the parts assume the positions shown in Figure 1, with strip 28 contacting a pin 31 threaded in terminal 23, while the strip 18 bears against pin 24 to force the insulated tip 25 to engage the strip 28. It will thus be seen that there is a complete circuit from terminal B through terminal 23 to strip 28, thence to terminal D; at the same time there is a complete circuit from terminal GR through terminal 22 and pin 24 to strip 18, thence to the plate 12 which is grounded.

When the thermostatic metal 16 is heated, it expands and moves strip 18 into contact with terminal 21 to complete a circuit from terminal C to ground, at the same time breaking the circuit from terminal GR to ground. The pin 24 is hence no longer in engagement with strip 18, and resilient strip 28 is allowed to bear against tip 25 and move away from terminal 23 to break the circuit between terminals B and D.

Continued motion of strip 18 anti-clockwise, referring to Figure 1, due to further expansion of the thermostatic metal 16 causes the support 20 to pivot anti-clockwise on pin 29 against the restraining action of spring 30. The pivoting of the support 20 acts to insure against the damaging of the thermostatic metal 16. If the support could not pivot, the metal would receive strains or bend and become permanently injured.

The object of making and breaking of the circuits described above is to automatically control a gas burning apparatus schematically shown in the diagram in Figure 3.

Referring to the diagram, power is received from a source 32 of alternating current at 110 volts and reduced by the transformer 33 to 15 volts. The current passes through a button switch 34 and thence to the terminal 35 to the primary of a spark coil 36. The secondary of the spark coil is connected to the terminal GR and thence to the ground and also to the spark plug, so that when the button 34 is depressed to close the circuit to energize the primary coil, sparks will jump from the electrode 14 to the burner 15, which is also grounded. At the same time the closing of the circuit causes a solenoid to be energized to open the valve 37 to allow the gas to flow. When the thermostatic element 16 has been heated to cause it to move as described above, the circuit is broken through the spark coil, and a new circuit is established to continue the energization of the solenoid to maintain the valve 37 open.

A strip 70 of insulating material is attached to the wall 10 and supports a terminal 71 which is connected to terminal C. Terminal 71 is connected to a high resistance wire 72 wound about a pad 73 of insulating material such as asbestos, the latter being carried on a strip 74 of thermostatic metal which is connected to the wire and contacts with a screw 75, the latter being grounded. (See Figure 2.) The shunt circuit provided by the wire 72, strip 74 and screw 75, maintains a flow of current through the solenoid of the valve 37 to maintain the latter open during the time when the thermostatic element is moving to engage contact 21.

Should, for any reason, the flame be extinguished, the thermostatic element will cool and the strip 18 will move from engagement with contact point 21, thus forcing the current through the shunt resistance wire 72. The current passing through wire 72 will heat thermostatic strip 74 to cause the latter to move outward to break contact with contact screw 75. As soon as this contact is broken the entire circuit will be broken, and the valve 37 will be allowed to close by gravity to stop the flow of gas.

The details of the electrical circuit shown in Figure 3 and the structure of the magnetic valve and the button switch are fully disclosed and explained in my pending applications, Serial Number 228,169, filed Oct. 24, 1927, Serial Number 271,485, filed April 20, 1928, and Serial Number 272,030, filed April 23, 1928.

A thermostatic switch control such as described above obviously may be readily employed in the igniting of fuel oils. When adapted for such a purpose, a gas supply is used, the gas pipe being grounded so that a spark will jump from the spark plug to the pipe to ignite the gas, which in turn produces a flame sufficient to properly ignite the fuel oil, after which the thermostatic element will expand to move the switch to open the spark plug circuit and discontinue the flow of gas.

In Figures 4 to 7, a modified form of the thermostatic switch is shown. In this form, a plate 40 mounted adjacent a gas burner has attached thereto the base 41 of a sleeve 42, in which is positioned a tube 43, held against rotation by a set screw 44. The tube 43 is provided with an apertured boss 45 in which is journalled a shaft 46. A coil 47 or thermostatic metal encircles the shaft and has one end attached to the shaft at 48 and the other end attached to the tube at 49.

A U-shaped support 50 has its lower leg 51 rotatably mounted on the boss 45, the rotation of the support 50 in a counter-clockwise direction (see Figure 5) being resisted by a torsion spring 52 which is positioned between a washer 53 and a nut 54 threaded on the boss 45. The upper leg 55 of the support 50 is provided with three terminals 56, 57, 58, corresponding respectively to the terminals 21, 22, 23, of the form shown in Figures 1 and 2.

A brass strip 59 is fixed to shaft 46 and lies between terminals 56 and 57, while a strip 60, fixed to leg 57, lies between terminals 57 and 58. Terminal 57 is provided with a sliding pin 61, having a flange 62 to limit the movement of pin 61. A tip 63 or insulating material is attached to flange 62.

The operation of this form of the invention, except for the coiled strips 47 of thermostatic metal is identically the same as that described for the form shown in Figures 1 and 2, there being four terminals on the base 41 corresponding to terminals B, C, D, and GR. The shaft 46 projects through an aperture in the support 40 so that the end 48 of the thermostatic element is positioned over the flame from the burner 64.

Upon the application of heat, the thermostatic coil metal 47 expands and turns the shaft 46 anti-clockwise, referring to Figure 5, until strip 59 engages terminal 56. Continued expansion of the thermostatic coil metal further rotates the shaft 46 anti-clockwise and causes the support 50 to correspondingly pivot on boss 45 against the restraining action of spring 52. The moving of the support eliminates the possibility of injury to the thermostatic metal 47. If the support could not pivot, then the metal would receive strains and bend, becoming permanently injured.

The foregoing disclosure is to be regarded as descriptive and illustrative only, and not as restrictive or limitative of the invention of which obviously an embodiment may be constructed including many modifications without departing from the general scope herein indicated and denoted in the appended claims.

Having thus described my invention, what I claim as new and desire to secure by Letters Patent is:—

1. A thermostatic switching device comprising a metal casing, a U-shaped support pivotally mounted on the casing, resilient means normally urging the support in one direction, three terminals mounted on and insulated from one leg of the support, a resilient metal strip fixed to the other leg of the support, said strip being positioned between the first and second terminals to complete an electrical circuit, a strip of thermostatic material fixed to the casing and positioned between the second and third terminals and engaging the second terminal when cold, and means associated with the thermostatic strip to break the circuit between the first and second terminals and establish another circuit when the strip is heated.

2. In an ignition device, a casing, a support pivotally mounted on the casing, three terminals mounted on the support, a resilient strip of metal positioned between the first and second terminals, said strip normally engaging the second terminal, a thermostatic element, means associated with the element and the strip to complete an electrical circuit between the first and second terminals when the element is cold, and means associated with the element to complete an independent electrical circuit when the element is heated to cause it to break the first circuit and move into engagement with the third terminal.

3. In an ignition device, a support, three terminals mounted on the support, a thermostatic element, means for normally closing an electrical circuit between the first and second terminals, means associated with the thermostatic element to break said circuit when the element is heated, and the latter being moved from contact with the second terminal into engagement with the third terminal to complete an independent circuit.

4. A thermostatic switching device, comprising a body, a support pivotally engaging thereon, terminals on the support, thermostatic metal attached on said body and connected for closing a circuit with one of said terminals while cold and adapted upon being heated to expand and open the connection with the said terminal and close a connection with another of said terminals, resilient means for resisting turning of said support in a direction from the first mentioned to the second mentioned terminals for relieving strains in the thermostatic metal due to further expansion, resilient means on said support for closing a circuit thru one of the terminals on the support while the thermostatic metal is cold and adapted to automatically open contact with said terminal upon expansion of the thermostatic metal.

5. A thermostatic switching device, comprising a body, a support pivotally engaging thereon, terminals on the support, thermostatic metal attached on said body and connected for closing a circuit with one of said terminals while cold and adapted upon being heated to expand and open the connection with the said terminal and close a connection with another of said terminals, resilient means for resisting turning of said support in a direction from the first mentioned to the second mentioned terminals for relieving strains in the thermostatic metal due to further expansion, resilient means on said support for closing a circuit thru one of the terminals on the support while the thermostatic metal is cold and adapted to automatically open contact with said terminal upon expansion of the thermostatic metal, comprising a slidable pin held against forward motion by connection with said thermostatic metal, and a spring held in contact with said terminal by said pin and adapted to move said pin upon expansion of the thermostatic metal and thus move out of contact with the terminal.

6. A thermostatic switching device, comprising a body, a support pivotally engaging thereon, terminals on the support, thermostatic metal attached on said body and connected for closing a circuit with one of said terminals while cold and adapted upon being heated to expand and open the connection with the said terminal and close a connection with another of said terminals, resilient means for resisting turning of said support in a direction from the first mentioned to the second mentioned terminals for relieving strains in the thermostatic metal due to further expansion, resilient means on said support for closing a circuit thru one of the terminals on the support while the thermostatic metal is cold and adapted to automatically open contact with said terminal upon expansion of the thermostatic metal, comprising a slidable pin held against forward motion by connection with said thermostatic metal, and resilient means held in contact with said terminal by said pin and adapted to move said pin upon expansion of the thermostatic metal and thus move out of contact with the terminal.

In testimony whereof I affix my signature.

GEORGE J. ZISCH.